United States Patent [19]

Schmeal et al.

[11] Patent Number: 4,679,291
[45] Date of Patent: Jul. 14, 1987

[54] ROBOTIC STAPLING SYSTEM FOR FIBER PLACEMENT FOR COMPOSITE PARTS

[75] Inventors: Walter R. Schmeal; Nazim S. Nathoo, both of Houston, Tex.; John A. Neate, Miles, Mich.

[73] Assignee: Shell Oil Company, Houston, Tex.

[21] Appl. No.: 832,949

[22] Filed: Feb. 26, 1986

[51] Int. Cl.⁴ ...................... B23P 11/00; B23P 19/00; B32B 31/00
[52] U.S. Cl. ........................................ 29/432; 29/798; 156/249
[58] Field of Search ...................... 29/432, 432.1, 798; 156/91, 92, 249, 250, 252, 253

[56] References Cited

U.S. PATENT DOCUMENTS

| | | | |
|---|---|---|---|
| 2,475,936 | 7/1949 | Allen | 29/798 |
| 3,837,985 | 9/1974 | Chase | 256/91 |
| 4,033,499 | 7/1977 | Butler | 29/798 |
| 4,281,785 | 8/1981 | Brooks | 29/432.1 |
| 4,370,183 | 1/1983 | Albo | 156/162 |
| 4,557,783 | 12/1985 | Grone et al. | 156/249 |
| 4,557,790 | 12/1985 | Wisbey | 156/249 |

FOREIGN PATENT DOCUMENTS 2053037 2/1981 United Kingdom .

OTHER PUBLICATIONS

"Industrial Robots Enhance Filament Winding Abilities", article in Advanced Materials newsletter, vol. 7, No. 7, ISSN 0734-7146, May 13, 1985.
"Use of Industrial Robots for Filament Winding", paper by G. Menges/E. Neise.

Primary Examiner—Howard N. Goldberg
Assistant Examiner—Steven E. Nichols

[57] ABSTRACT

A method and apparatus for forming articles of filament reinforced thermosetting plastic, wherein the articles have a core member and the filament reinforcement is applied by a filament placement process. The filament reinforcement is attached to the core member by means of staples especially in concaved portions of the core member. The thermosetting resin may be applied to the article, before, during, or after the filaments are attached to the core member. The filament placement and attachment of the fasteners are carried out by robots that can be adjusted for various shapes by means of programmable controls.

8 Claims, 4 Drawing Figures

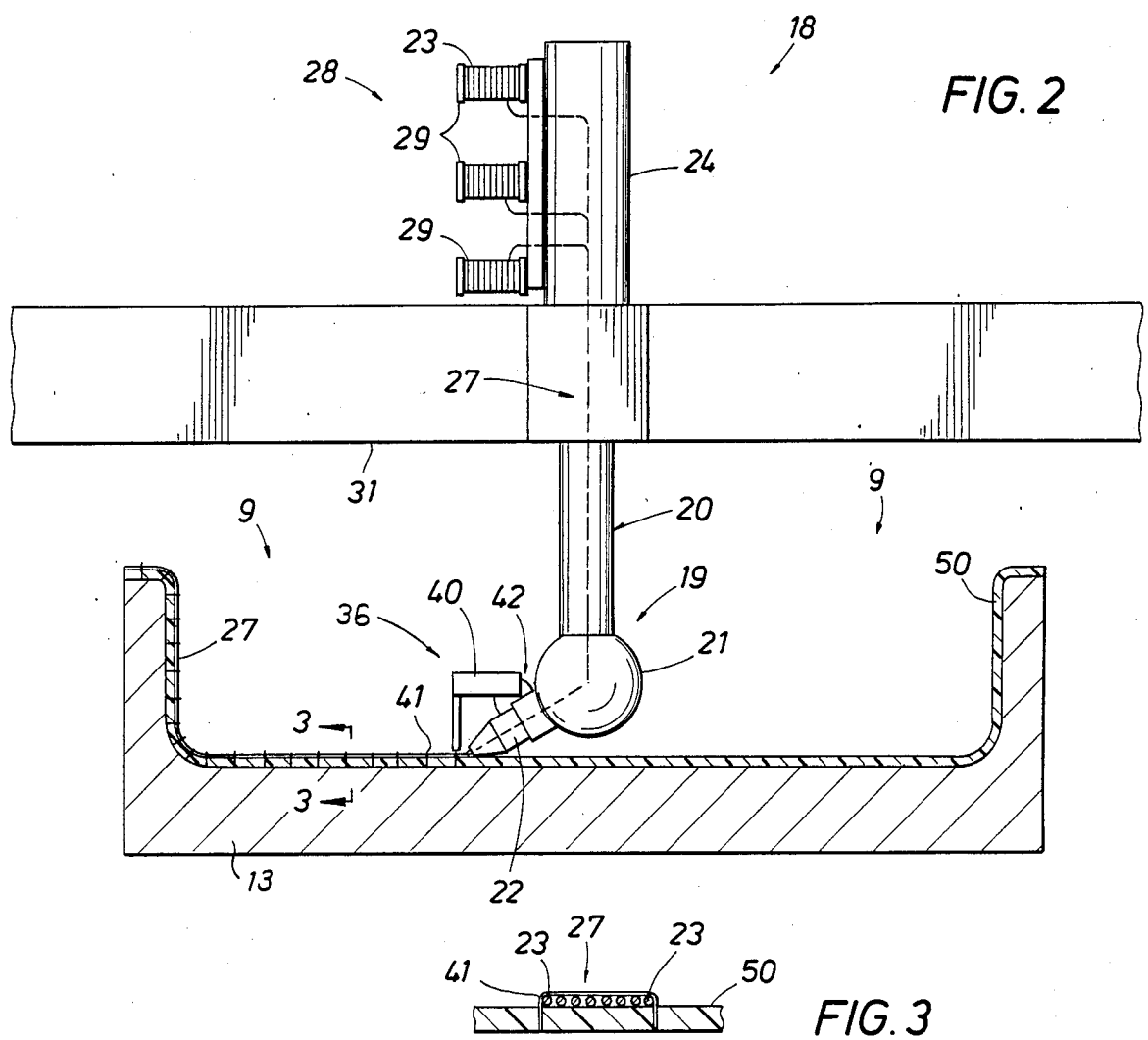
FIG. 2
FIG. 3
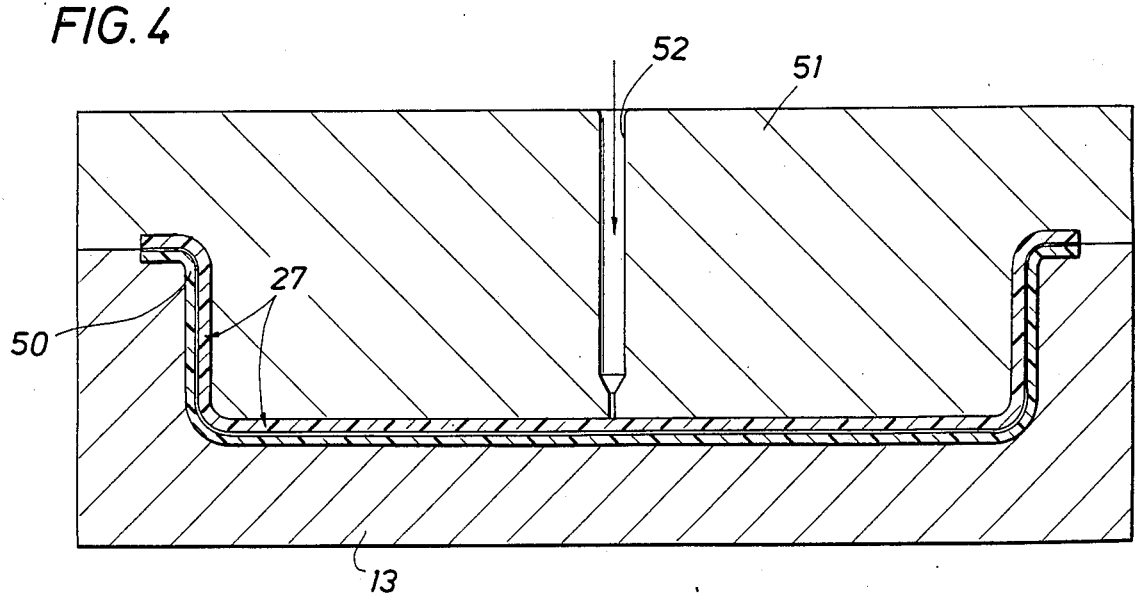
FIG. 4

ROBOTIC STAPLING SYSTEM FOR FIBER PLACEMENT FOR COMPOSITE PARTS

RELATED APPLICATION

This application is related to co-pending application Ser. No. 919,920 entitled "Method and Apparatus for Composite Parts Assembly", filed Oct. 16, 1986.

BACKGROUND OF THE INVENTION

The present invention relates to the fabrication of filament-reinforced parts, wherein the part typically has a central core member and a filament matrix placed by a wrapping or winding process about the exterior surface of the core member.

The strength of the part results from the number and orientation of the filaments which form the filament matrix. The core member is typically formed from lightweight foam, fiberglass roving, chopped fiberglass matting, balsa, or other core materials well known to the art. The filaments are typically formed from minute discrete strands of fiberglass, carbon fiber, or other high strength low weight fibrous material, well known to the art.

The filament matrix is dimensionally stabilized relative to the core member by being immersed within a thermosetting resin, the resin also contributing to the overall strength of the part. It is well recognized that the resin may be applied to the filament matrix after the matrix has been wound about the part, or by passage of the filaments through a bath of unreacted resin prior to winding, or by other methods well known to the art whereby the filament matrix is wetted with the thermosetting resin before, during, or after application to the core member.

At least a portion of the filament matrix may be preformed prior to attachment to the coremember, such as by the use of cloths or tapes already having a multiplicity of filaments oriented in a desired array, as is well known to the art. Alternatively, the filament matrix may be formed directly on the core member by winding a single filament about the member to form several layers, each layer typically having a different filament orientation than the previous layer.

It should be noted that manual placement of cloth over a large surface area is more labor intensive than the automated winding of a single filament or tape about a core member having a simple shape. Composite parts, such as propeller blades and submarine periscope masts for example, are therefore now being efficiently fabricated by use of automated equipment that places the filament matrix against the core member by a winding process.

Automated fabrication of these parts is limited however to parts that do not have recesses formed in their exterior surfaces. If the filament matrix is wound about a part having surface recesses the filament matrix will "bridge over" these recesses, which will cause undesirable voids to form between the filament matrix and the recessed surface of the part.

No inexpensive method exists for the mass production of filament-reinforced parts having recesses formed in their exterior surface.

A method and apparatus therefore needs to be developed that allows for the inexpensive fabrication of parts having surface recesses by use of a filament matrix placement process.

SUMMARY OF THE INVENTION

The apparatus of the present invention comprises a robotic arm capable of placement of the filament matrix against a core member having surface recesses, the arm used in combination with a fastening device such as a stapler that fastens and holds the filament matrix in position against the core member until the matrix can be dimensionally stabilized relative to the core member by use of a thermosetting resin. The core member with attached filament matrix can for example be placed in a mold and impregnated with suitable resins to form a completed composite part.

The robotic arm is mounted on a suitable supporting structure and designed with sufficient axes of movement to allow placement of the filament matrix against the recessed portions of the core member. The robotic arm may typically traverse laterally across the core member and move longitudinally and vertically relative to the core member. The core member may be carried by a support member which also may have the capability to rotate the core member about at least one axis of rotation. The support member may also form a portion of the resin injection mold, so that after the filament matrix is attached to the core member the remaining portion of the resin injection mold may be placed around the remainder of the core member.

The stapler fastens the filament matrix to the core member with staples that are compatible with both the filament, resin, and core member materials. These staples can be either uniformly placed or used only where it is necessary to hold the reinforcing filament matrix in contact with recesses formed in the surface of the core member.

It is therefore an object of the present invention to describe a method for fabricating a filament-reinforced part using a core member having a surface with recesses defined therein, said method comprising the steps of placing a filament matrix against at least a portion of the core member, and thereafter fastening at least a portion of the filament matrix to at least a portion of the core member.

It is therefore an object of the present invention to provide an apparatus for fastening a filament matrix to a core member having recesses defined in the surface thereof.

It is a feature of the present invention to provide an apparatus having a moveable arm and fastening means aattached thereto to fasten a filament matrix to at least a portion of a core member.

These and other features, objects, and advantages of the present invention will become apparent from the following detailed description, wherein reference is made to the Figures in the accompanying drawings.

BRIEF DESCRIPTION OF THE DRAWINGS

The present invention will be more easily understood from the following description when taken in conjunction with the attached drawings in which:

FIG. 2 is a cross section taken along line 2—2 of FIG. 1.

FIG. 3 is a cross section taken along line 3—3 of FIG. 2.

FIG. 4 is a cross section of the completed mold showing the injection of thermosetting resin.

DESCRIPTION OF THE PREFERRED EMBODIMENT

Figure 1:
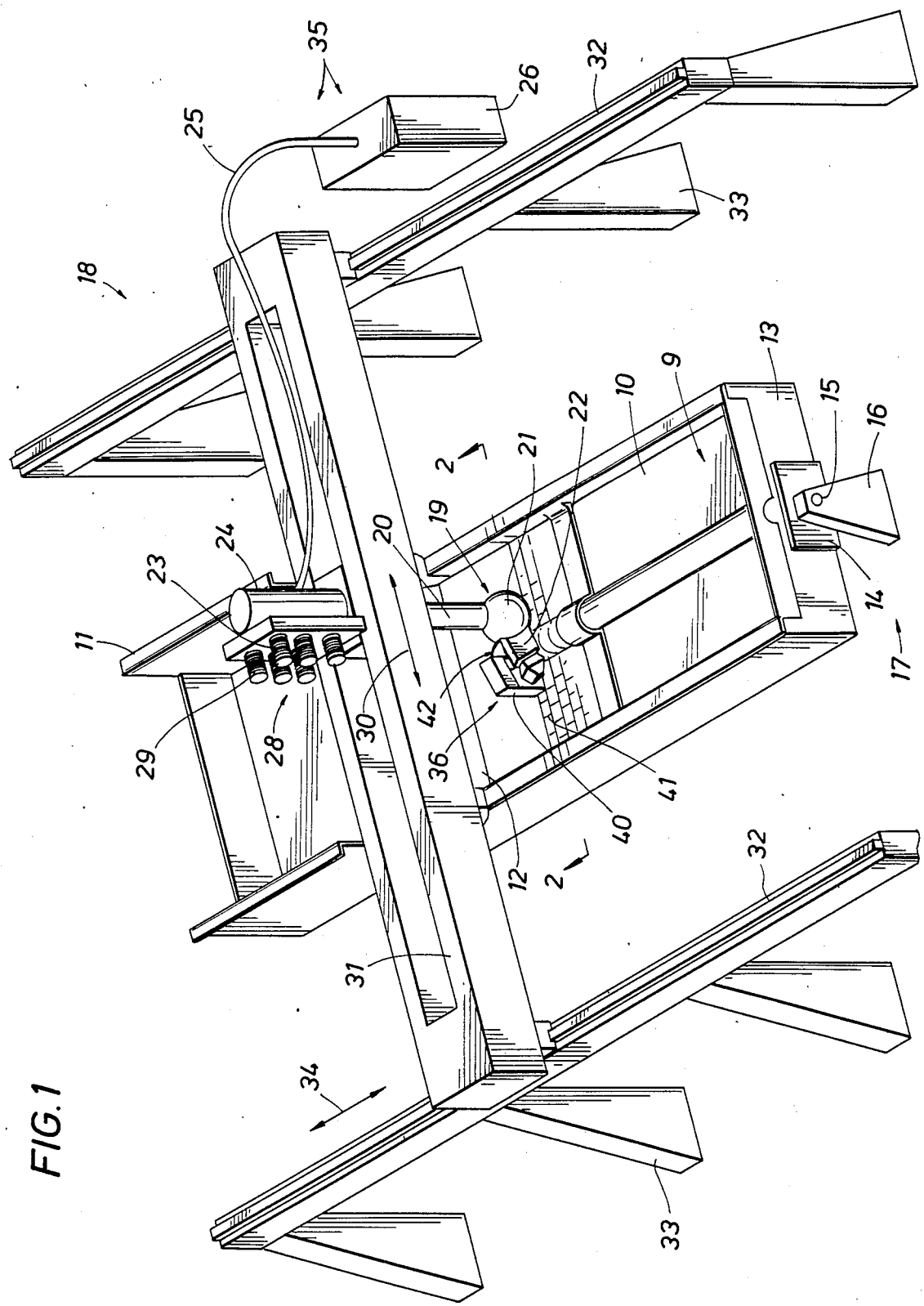
FIG. 1 is a pictorial view of the complete apparatus showing the fabrication of an article.

Referring now to FIGS. 1 and 2 there is shown a pictorial view and side view respectively of the apparatus of this invention. More particularly, there is shown the apparatus fabricating a part 10 having a recess 9 which may comprise for example the floor pan of an automobile body. The part 10 is joined to the rear section 11 along the line 12. The part 10 in a preferred embodiment is carried by support means 17, which may take the form of mold 13, member 14, and shaft 15 supported by bracket 16. The part 10 is shown supported by the bottom one-half of mold 13. The mold 13 is supported by member 4 which may be mounted for rotation about the shaft 15. The part 10 utilizes a core member 50 which in a preferred embodiment is formed from a closed-cell foam material, such as styrofoam, urethane, or urethane polyester foams. Also, the ability to rotate the mold 13 about the axis 15 facilitates placement of the filament-reinforcing material against the core member 50, as described below.

Filament placement means 18 in a preferred embodiment comprises a conventional industrial robot 20 having a first drive means 19 such as a motorized head member 21 connected to a moveable arm 22. The robot 20 is utilized for placing filament matrix means 27 against the core member 50. The filament matrix means 27 may comprise a single filament strand or alternatively may comprise a plurality of preformed strands formed for example into a tape having a predetermined width, or any other shape capable of being placed against the core member 50 by the movable arm 22.

The robot 20 should be moveable about 3 axes relative to the part 10 so that the arm 22 may accurately follow the recessed contours of the part 10. A suitable robot 20 would be one such as the Model T3886 Gantry Industrial Robot, manufactured by Cincinnati Milacron Inc. of Cincinnati, Ohio.

The movable arm 22 of the robot 20 may be described as having more than three axes of movement, due to movement of the arm 22 about head member 21, coupled with movement of the head member 21 relative to beam 31 and parallel tracks 32. The Model T3886 Gantry Industrial Robot is described for example as having a "six axes-compact three roll wrist". It is well recognized, however, that any combination of movement(s) of arm 22 and head member 21 will only result in movement of the end of arm 22 through three axes defined relative to the core member 50.

The robot 20 of the filament placement means 18 is provided with control means 35 which are coupled to said first drive means 19 so as to actuate arm 22 to position the filament matrix means 27 against the core member 50, regardless of the contour of the recess(es) 9 formed by the surface of the core member 50. The control means 35 such as a microprocessor-based programmable controller available on the Mode T3886 controls the movement of arm 22 about the 3 axes defined relative to part 10. The control means 35 is provided with power cable 25, control circuits 26, and a power source 24 which may be mounted on the moveable portion of the filament placement means 18.

The filaments 23 pass from the reels 29 down through the interior of the robot 20 and out the arm 22 of the robot 20 as shown in FIG. 2. Power cable 25 connects the power source 24 to the control circuits 26 of the robot. The cable 25 contains not only the power for the robot 20 but also suitable conductors for transmitting the signals to the robot 20 to control its movement.

The robot 20 is mounted for movement along the beam 31 in the direction indicated by the arrows 30. The beam 31, in turn, is mounted on a pair of parallel tracks 3 which are supported by members 33. This will permit movement of the beam 31 along the direction indicated by the arrows 34. The movement of the robot 20 along the beam 31 and the movement of the beam 31 along the parallel tracks 32 can be controlled by the circuits 26 in response to a preset or predetermined program. With the ability to move relative to the beam 31 and parallel tracks 32 plus the movement of the arm 22 relative to the core member 50, the arm 22 will be capable of positioning the filament matrix means 27 on all portions of the recess 9 of the core member 50. In addition, if necessary, the mold 13 containing the core member 50 of the part 10 can also be rotated about the axes of shaft 15 to provide an additional degree of movement.

Referring more closely now to FIGS. 2, 3 and 4, there is shown the details of the apparatus for placing the filament matrix means 27 against the core member 50. In particular, in FIG. 2 there is shown the filament matrix means 27 being discharged from the arm 22 of the robot and positioned along the surface of the core member 50. As the robot 20 moves to the right to position the filament matrix means 27, it will of course be necessary for the robot 20 to move upwardly as the head member 21 is rotated by first drive means 29 so that the filament matrix means 27 can be positioned on the vertical wall of the core member 50 and then the horizontal flange at the top. As the filament matrix means 27 is positioned against the core member 50, fastener means 36 are used to fasten the matrix means 27 to the core member 50. In a preferred embodiment the fastener means 36 comprises a stapler 40 that inserts the prongs of staples 41 into the core member 50, the staples 41 effectively securing the filaments 23 to the core member 50.

A second drive means 42 similar to head member 21 is operatively engaged between the stapler 40 and the arm 22 so as to maintain the stapler 40 in proper orientation to the filament matrix means 27 as the matrix means 27 follows the contours of the recess 9. Both the first and second drive means 19, 42 respectively, are controlled by control means 35.

As shown in FIG. 4, the lower half of the mold 13 is mated to an upper half of the mold 51 so that the core member 50 and the filament matrix means 27 are held in a fixed position to ensure the accuracy of the overall dimensions of finished part 10. Suitable thermosetting resin is injected into the opening 52 to saturate the filament matrix means 27 and convert it to a solid mass. Once the resin has catalyzed and set the mold 13, 51 can be opened and the part 20 removed. It should also be recognized that the core member 50 may be formed by fastening together a plurality of individual peices.

The filaments 23 used for reinforcing materials are preferably glass fibers due to their relatively low cost. It may be desirable in certain applications to include stronger fibers such as carbon, boron, or Kevlar ® fibers. Likewise, the resin used for forming the composite is preferably polyester resin although higher quality and more expensive resins such as polyvinylesters or epoxy resins may also be used. By proper selection of a resin and a curling agent or catalyst it would be possible to ensure a rapid curing or setting of the resin, thus only a short time will be required for completion of the article.

This will reduce the number of molds necessary to form a continuous production process. In order to develop a continuous production process, it will be necessary to use several molds to permit application of the fiber reinforcing to one part 10 while the previous part 10 is being injected with resin and the composite formed.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A method for fabricating a filament-reinforced part using a core member having recesses defined in the surface thereof, said method comprising:

mounting the core member;

placing filament matrix means against said recesses formed in the surface of said core member; and fastening the filament matrix means in place in said recesses of said core member.

2. An apparatus for fabricating a filament-reinforced part using a core member having recesses formed in the surface thereof, said apparatus comprising:

support means for carrying said core member;

filament placement means, said filament placement means having a moveable arm;

first drive means, said drive means being connected to said arm to move said arm;

filament matrix supply means, said supply means adapted to supply filament matrix means to said arm;

control means, said control means being coupled to said first drive means to actuate said arm to position said filament matrix means against said core member;

fastener means, said fastener means being carried by said moveable arm, and second drive means coupled to said fastener means to position said fastener means adjacent said filament matrix means.

3. The apparatus of claim 2 wherein said filament placement means comprises an industrial robot having teach-in programming.

4. The method of claim 1 and the additional step of forming said core member from a plurality of individual pieces and fastening said pieces together to form said core.

5. The apparatus of claim 2 wherein said support means has at least one axis of rotation for rotating said core member relative to said filament placement means.

6. The apparatus of claim 2 wherein said arm of said filament placement means has at least three axes of movement relative to said core member.

7. The apparatus of claim 2 wherein said filament matrix supply means is secured to said arm of said filament placement means.

8. A method for fabricating a filament reinforced part using a core member having recesses defined in the surface thereof, said method comprising:

placing filament matrix means against at least a portion of said core member having said recesses, and fastening at least a portion of said filament matrix means to said at least a portion of said core member having said recesses.

* * * * *